(12) United States Patent
Ochiai et al.

(10) Patent No.: US 10,120,197 B2
(45) Date of Patent: Nov. 6, 2018

(54) THREE DIMENSIONAL DISPLAY DEVICE COMPRISING A SECOND BARRIER ELECTRODE CONNECTED TO ONE OF A PLURALITY OF BUS ELECTRODES THROUGH A FIRST BARRIER ELECTRODE AND LIQUID CRYSTAL PANEL

(71) Applicant: Japan Display Inc., Tokyo (JP)

(72) Inventors: Takahiro Ochiai, Tokyo (JP); Shinichirou Oka, Tokyo (JP); Keita Sasanuma, Tokyo (JP); Kouichi Shirai, Tokyo (JP)

(73) Assignee: Japan Display Inc., Tokyo (JP)

( * ) Notice: Subject to any disclaimer, the term of this patent is extended or adjusted under 35 U.S.C. 154(b) by 129 days.

(21) Appl. No.: 15/082,323

(22) Filed: Mar. 28, 2016

(65) Prior Publication Data
US 2016/0291337 A1 Oct. 6, 2016

(30) Foreign Application Priority Data

Mar. 31, 2015 (JP) ................................ 2015-073164

(51) Int. Cl.
*G02B 27/22* (2018.01)
*G02F 1/1333* (2006.01)
*G02F 1/1343* (2006.01)

(52) U.S. Cl.
CPC ..... *G02B 27/2214* (2013.01); *G02F 1/13439* (2013.01); *G02F 1/133345* (2013.01); *G02F 1/134309* (2013.01)

(58) Field of Classification Search
CPC .. G02F 1/133514; G02F 1/0316; G02F 1/155; G02F 2001/133612
See application file for complete search history.

(56) References Cited

U.S. PATENT DOCUMENTS

| 2006/0215262 | A1 | 9/2006 | Kim |
| 2009/0002267 | A1 | 1/2009 | Nam et al. |
| 2011/0157496 | A1* | 6/2011 | Im ..................... G02B 27/2214 349/15 |

(Continued)

FOREIGN PATENT DOCUMENTS

| JP | 2006-189766 A | 7/2006 |
| JP | 2009-9081 A | 1/2009 |

*Primary Examiner* — Paul Lee
(74) *Attorney, Agent, or Firm* — Typha IP LLC

(57) ABSTRACT

A parallax barrier panel including a first substrate having a flat electrode, and a second substrate, the liquid crystal sandwiched therebetween. The second substrate has first barrier electrodes extending in a first direction and arrayed at a first pitch in a second direction, and has second barrier electrodes, the first and the second barrier electrodes having an interlayer insulating film interposed therebetween. Gaps between the first barrier electrodes are blocked by the second barrier electrodes when viewed in a plan view. Each of the first barrier electrodes is paired with one of the second barrier electrodes. Bus electrodes extend outside the display area along a side thereof. The first barrier electrodes are connected to the bus electrodes via first through holes formed in the interlayer insulating film. The second barrier electrodes are connected to the first barrier electrodes via second through holes formed in the interlay insulating film.

14 Claims, 13 Drawing Sheets

(56) References Cited

U.S. PATENT DOCUMENTS

| | | | | |
|---|---|---|---|---|
| 2012/0105750 A1* | 5/2012 | Yoon | ............... | G09G 3/003 |
| | | | | 349/15 |
| 2012/0162550 A1* | 6/2012 | Jeong | ............ | G02F 1/134309 |
| | | | | 349/15 |
| 2013/0009859 A1* | 1/2013 | Woo | ............ | G02B 27/2214 |
| | | | | 345/156 |
| 2013/0229587 A1* | 9/2013 | Takama | ............ | G02B 27/22 |
| | | | | 349/33 |
| 2013/0342586 A1* | 12/2013 | Kim | ............... | G02F 1/1313 |
| | | | | 345/690 |
| 2015/0219909 A1* | 8/2015 | Jeong | ............ | G02B 27/2214 |
| | | | | 349/15 |

\* cited by examiner

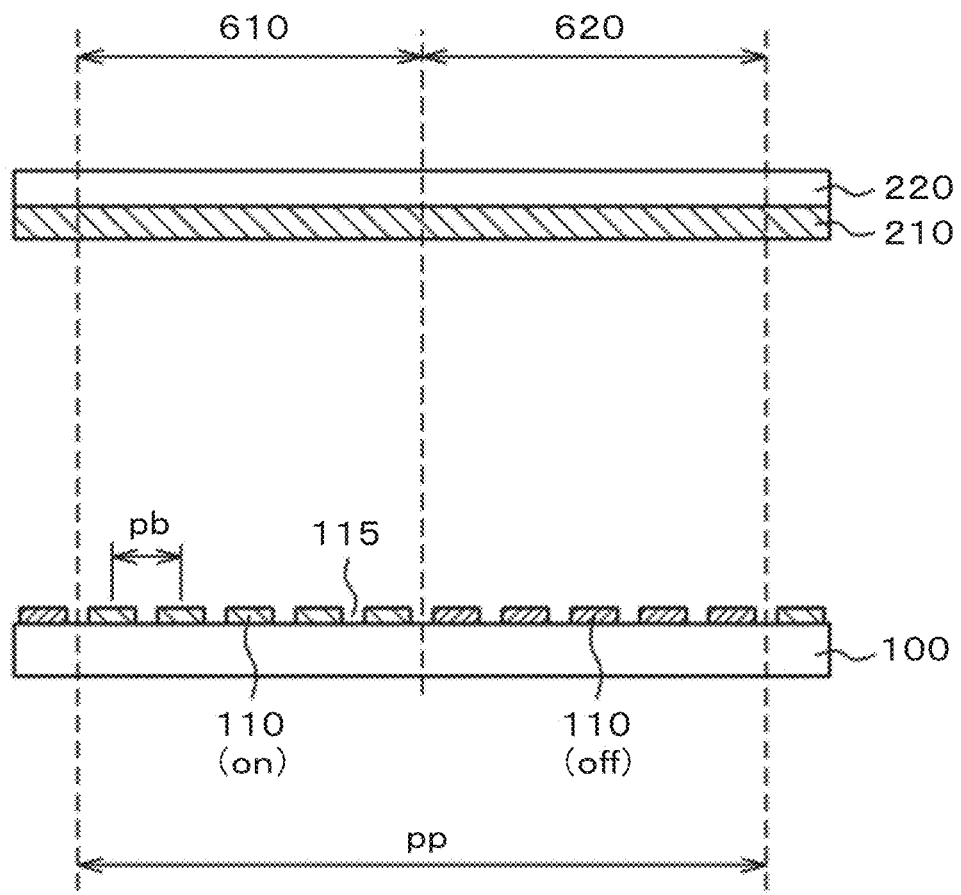

A-A

B-B

1

THREE DIMENSIONAL DISPLAY DEVICE COMPRISING A SECOND BARRIER ELECTRODE CONNECTED TO ONE OF A PLURALITY OF BUS ELECTRODES THROUGH A FIRST BARRIER ELECTRODE AND LIQUID CRYSTAL PANEL

CLAIM OF PRIORITY

The present application claims priority from Japanese Patent. Application JP 2015-73164 filed on Mar. 31, 2015, the content of which is hereby incorporated by reference into this application.

BACKGROUND OF THE INVENTION

1. Field of the Invention

The present invention relates to a display device. More particularly, the invention relates to a three-dimensional display device that uses a parallax barrier panel with liquid crystal.

2. Description of the Related Art

The parallax barrier method is a well-known three-dimensional (3D) image display method. This is a method in which an image for the field of view of the right eye and an image for the field of view of the left eye are displayed alternately behind a so-called parallax barrier panel having a plurality of fine slits in a longitudinal direction, the alternated images constituting a 3D image through the parallax barrier.

The parallax barrier panel is formed by having liquid crystal sandwiched between a barrier substrate having barrier electrodes and a common substrate with a common electrode. The parallax barrier panel using liquid crystal offers the advantage of presenting image display when impressed with a barrier signal for driving the liquid crystal and providing 2D image display when not impressed with the barrier signal.

JP-A-2009-9081 discloses a parallax barrier method in which a two-layer barrier electrode structure has its barrier side and its transmission side alternated at short intervals to reduce a decrease in transmission factor incurred by the parallax barrier panel.

JP-A-2006-189766 discloses a structure in which both sides of barrier electrodes are provided with a first transmission electrode and a second transmission electrode which are impressed with a transmission signal and a barrier signal alternately in each frame to permit deep looking 3D display while reducing a decrease in transmission factor.

SUMMARY OF THE INVENTION

Barrier electrodes that make up a barrier are constituted by indium tin oxide (ITO), for example, to form transparent electrodes. However, the ITO-constituted terminals are not totally transparent and have a predetermined transmission factor. The ITO portions of the electrodes appear darker than the other portions. Because the barrier electrodes are formed in a cyclic pattern, they can interfere with a black matrix or video signal lines generated by the liquid crystal display panel, causing a moire. This type of moire can occur during 2D image display.

Meanwhile, the parallax barrier method entails crosstalk that can occur when the point of view is shifted. This phenomenon is prevented by a method, for example, of dividing the barrier area into a plurality of areas and shifting these barrier areas in keeping with movements of the point of view. This is called the eye-tracking method. The eye-tracking method involves having a single barrier area formed with a plurality of barrier electrodes that have transmissive regions left therebetween, generating a moire. This type of moire can occur during 3D display.

The above types of moire are suppressed by a method in which barrier electrodes are wired in two layers to eliminate the gaps between the divided barrier electrodes. The problem with the two-layer barrier electrode structure, however, is that the wiring configuration is complicated and so is the process of manufacturing it.

An object of the present invention is to provide a low-cost, highly reliable three-dimensional (3D) display device operating by a parallax barrier method in which the two-layer wiring structure to counter the moire phenomenon is simplified.

The present invention proposes achieving the above object by use of specific means outlined below.

(1) According to one embodiment of the present invention, there is provided a three-dimensional display device having a liquid crystal parallax barrier panel disposed on a display panel. The parallax barrier includes a first substrate over which electrodes are formed flat and a second substrate having a display area, the first and the second substrates having liquid crystal sandwiched therebetween. The second substrate has first barrier electrodes extending in a first direction and arrayed at a first pitch in a second direction, and has second barrier electrodes extending in the first direction and arrayed at the first pitch in the second direction, the first and the second barrier electrodes having an interlayer insulating film interposed therebetween. Gaps between the first barrier electrodes are blocked by the second barrier electrodes when viewed in a plan view. Each of the first barrier electrodes is paired with one of the second barrier electrodes which is adjacent thereto when viewed in a plan view to form a barrier electrode couple, the paired first and second barrier electrodes being impressed with the same potential. The barrier electrode couples are arrayed at the first pitch in the second direction. Bus electrodes extend outside the display area along a side thereof. The first barrier electrode of each barrier electrode couple is connected to one bus electrode via a first through hole formed in the interlayer insulating film. The second harrier electrode of each barrier electrode couple is connected to the first barrier electrode of the barrier electrode couple via a second through hole formed in the interlay insulating film.

(2) Preferably in the three-dimensional display device described in the paragraph (1) above, a plurality of the barrier electrode couples may form a barrier area of the parallax barrier panel.

(3) Preferably in the three-dimensional display device described in the paragraph (1) above, the three-dimensional display device may be driven by an eye tracking system.

(4) Preferably in the three-dimensional display device described in one of the paragraphs (1) to (3) above, the second through holes may be arrayed in the second direction between the bus electrodes and the display area.

(5) Preferably in the three-dimensional display device described in one of the paragraphs (1) to (3) above, the first through hole and the second through hole for a first one of the barrier electrode couples may be formed on one bus electrode when viewed in a plan view, and the first through hole and the second through hole for a second one of the barrier electrode couples may be formed on another bus electrode when viewed in a plan view.

BRIEF DESCRIPTION OF THE DRAWINGS

FIG. 6 is a schematic view showing an example of forming the barrier area using a plurality of barrier electrodes;

BRIEF DESCRIPTION OF THE DRAWINGS

The specifics of the present invention are described below using preferred embodiments.

DESCRIPTION OF THE PREFERRED EMBODIMENTS

First Embodiment

Figure 1:
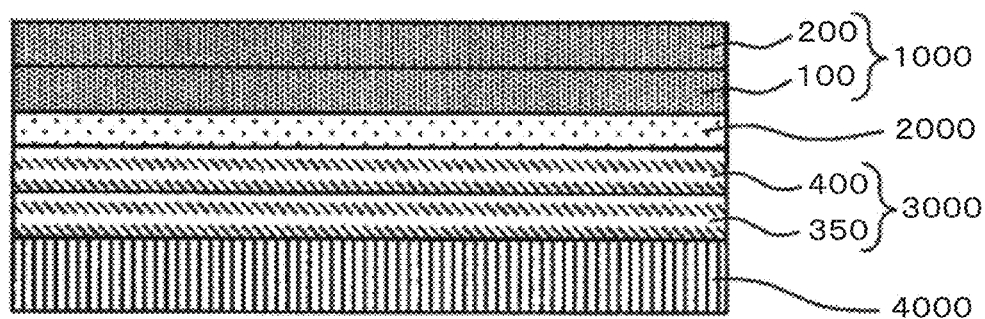
FIG. 1 is a schematic cross-sectional view of a three-dimensional (3D) display device operating by the parallax barrier method according to the present invention.

FIG. 1 is a schematic cross-sectional view of a three-dimensional (3D) display device according to the present invention. The device shown in FIG. 1 is configured to turn images formed by a liquid crystal display panel 3000 into a viewable 3D image using a liquid crystal parallax barrier panel 1000. A transparent adhesive material 2000 bonds the liquid crystal parallax barrier panel (simply the liquid crystal panel or the parallax barrier panel hereunder) 1000 to the liquid crystal display panel 3000.

The liquid crystal display panel 3000 is structured to have a thin-film transistor (TFT) substrate 350 and a counter substrate 400 put together by a sealing material with liquid crystal sealed therebetween, the TFT substrate 350 being formed by pixels with thin film and pixel electrodes in a matrix pattern. Over the TFT substrate 350, scanning lines extend in a first direction and are arrayed in a second direction. Also over the TFT substrate 350, video signal lines extend in the second direction and are arrayed in the first direction. The portions enclosed by the scanning lines and the video signal lines constitute the pixels. Over the counter substrate 400, a black matrix is generally formed at the portions corresponding to the scanning lines or the video signal lines of the TFT substrate 350 so as to improve the contrast of the screen.

Since liquid crystal does not illuminate itself, a backlight 4000 is disposed behind the liquid crystal panel 3000. In addition to light sources, the backlight 4000 includes optical components such as a light guiding panel and a diffuser and, in some cases, a prism sheet to improve the utilization efficiency of light.

Figure 2:
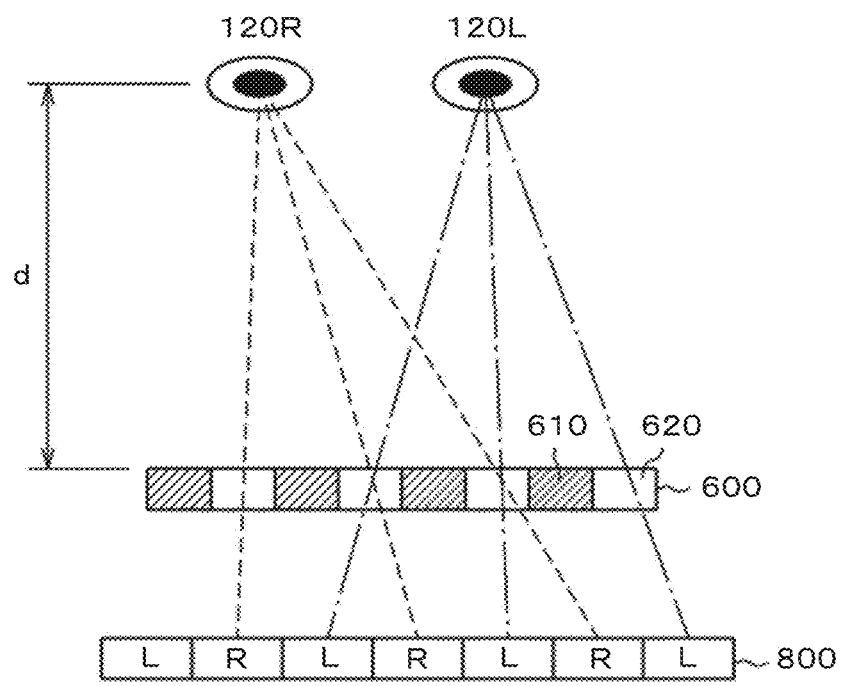
FIG. 2 is a schematic cross-sectional view illustrating the operating principle of the parallax barrier method.

FIG. 2 is a schematic cross-sectional view illustrating the operating principle of the parallax barrier method. A barrier area 610 and an opening area 620 provided in a barrier pattern 600 allow the right and the left eyes of a person to recognize, respectively, a right-eye image R and a left-eye image L that are formed by the display device 800. This enables the person to recognize a 3D image.

Figure 3A:
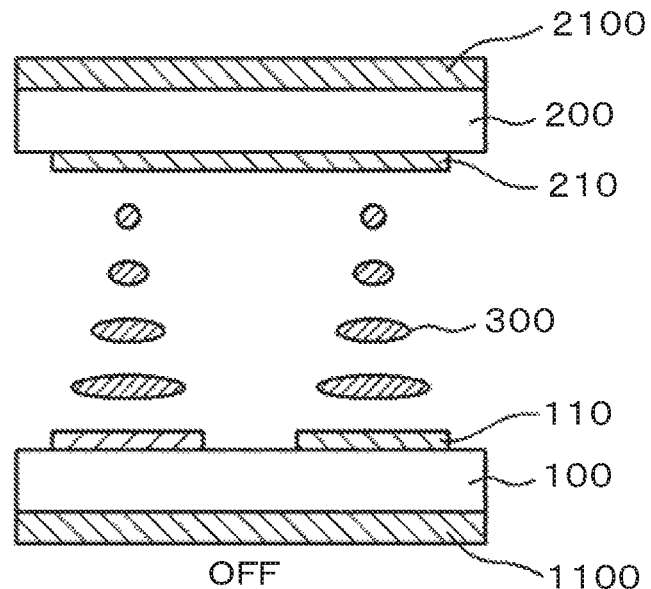
FIGS. 3A and 3B are cross-sectional views showing how a barrier panel operates.
Figure 3B:
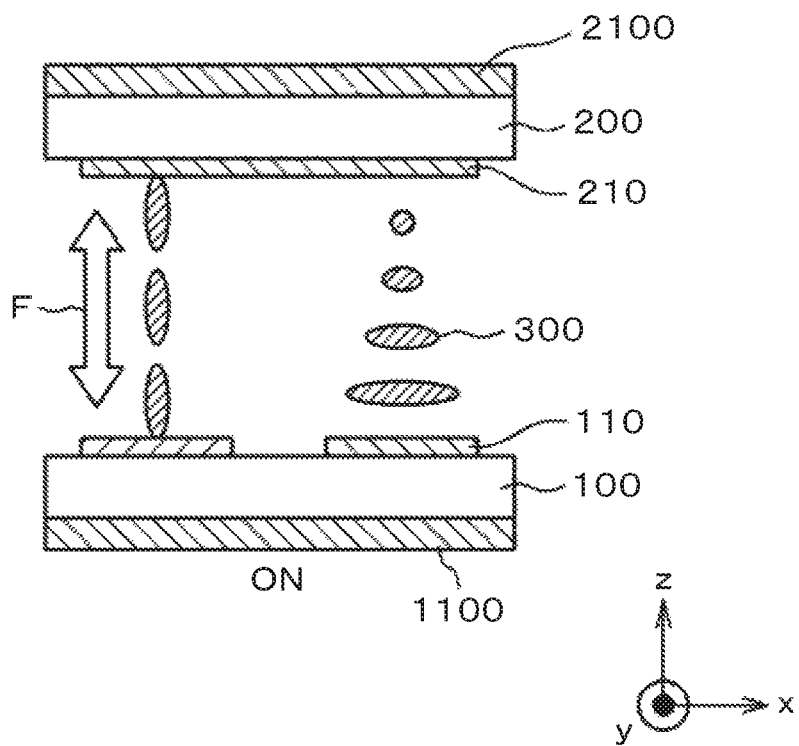

FIGS. 3A and 3B are cross-sectional views showing how a liquid crystal parallax barrier panel operates. Both. FIG. 3A and FIG. 3B indicate a twisted nematic (TN) liquid crystal panel. An upper polarizing plate 2100 is attached to the outside of a common substrate 200, and a lower polarizing plate 1100 is attached to the outside of a barrier substrate 100. In FIG. 3A, a common electrode 210 is formed flat over the entire surface of the common substrate 200. Over the barrier substrate 100, stripe-shaped barrier electrodes 110 arrayed at a predetermined pitch extend in a Y coordinate direction. Liquid crystal molecules 300 are twisted by 90 degrees from the barrier substrate 100 toward the common substrate 200. FIG. 3A shows a state in which no voltage is impressed between the common electrode 210 and the barrier electrodes 110, so that the light from the liquid crystal panel is not modulated. In this state, a two-dimensional (2D) image is displayed.

FIG. 3B shows a state in which a voltage is impressed to every other barrier electrode 110 of the same parallax barrier panel. An area whose barrier electrode 110 is impressed with the voltage blocks light, and an area whose barrier electrode 110 is not impressed with the voltage allows light to pass through. When viewed from the principal surface of the parallax barrier panel, stripe-shaped light-blocking areas and stripe-shaped light-transmitting areas are seen formed alternately. In FIG. 3B, arrow F indicates an electrical field.

As shown in FIG. 2, the parallax barrier method requires fixing the human eyes and the parallax barrier panel in predetermined positions in order to present a complete 3D image. If the human eyes shift crosswise, the pixels supposed to be recognized only by the left eye also come to be recognized by the right eye, and the pixels supposed to be recognized solely by the right eye are also recognized by the left eye. This phenomenon is called crosstalk, which degrades the quality of 3D images.

Figure 4:
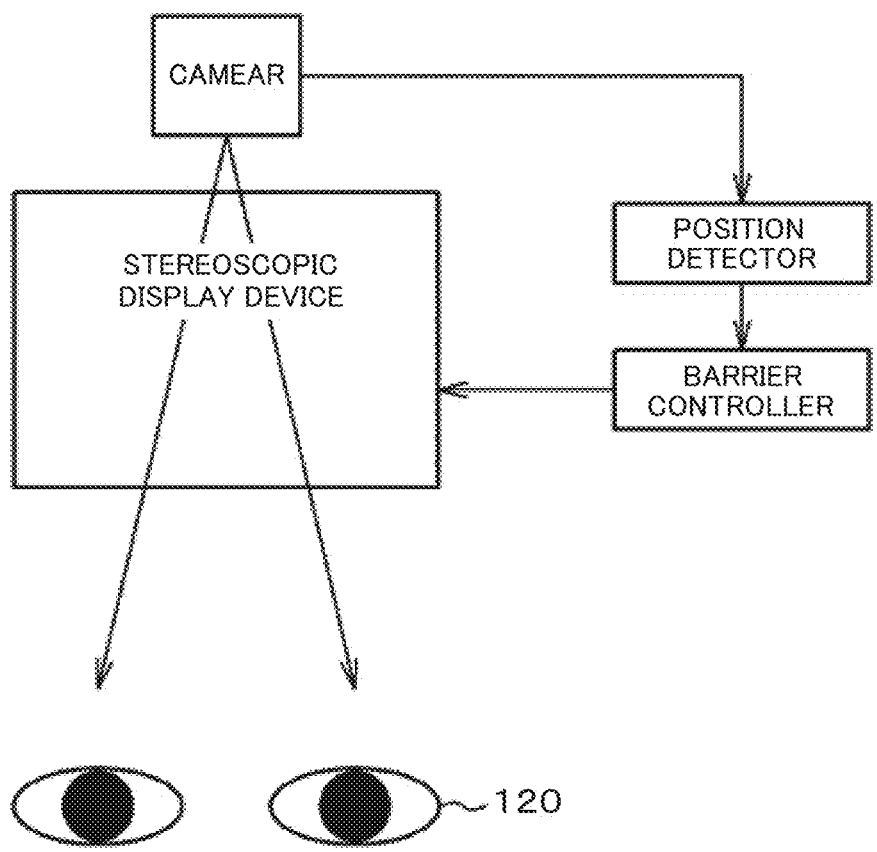
FIG. 4 is a block diagram of an eye tracking system.

This phenomenon is prevented by a method of moving the barrier position in keeping with the human eye positions. FIG. 4 is a block diagram showing a system that tracks human eye movements using a camera and feeds back the movement data to a display device. This system will be called the eye tracking system hereunder. In FIG. 4, a camera measures the positions of the human eyes 120. The camera may be a photographic camera attached to mobile terminals, for example. This system can operate without resorting to a dedicated camera.

In FIG. 4, the positions of the human eyes 120 detected by the camera are input to a position detector that inputs its signal to a barrier controller. The barrier controller in turn generates a signal to control the position of a barrier pattern over the barrier substrate. This signal is input to a stereoscopic display device (3D display device) that has a parallax barrier panel.

Figure 5A:
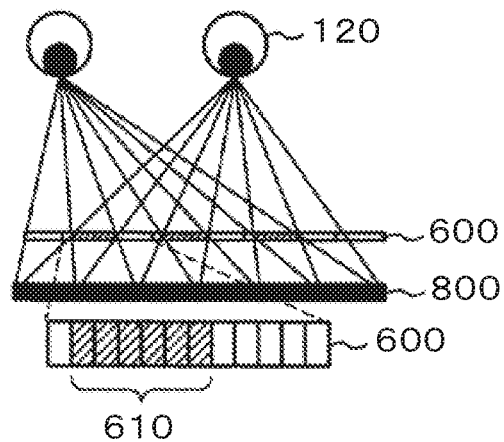
FIGS. 5A, 5B and 5C are cross-sectional views showing how parallax characteristics are improved by having a barrier area formed with a plurality of barrier electrodes.
Figure 5B:
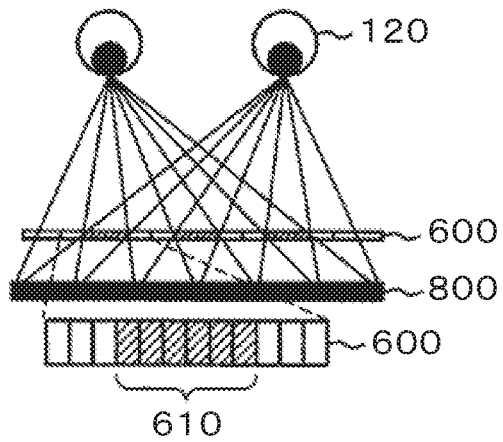
Figure 5C:
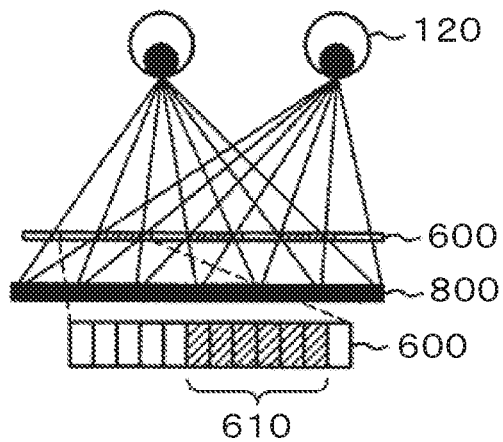

FIGS. 5A, 5B and 5C schematically show how a barrier pattern 600 is moved in keeping with the movements of the human eyes 120 so that the pixels for the right eye and those for the left eye will not produce crosstalk when the human eyes 120 shift. In FIGS. 5A to 5C, the person can recognize a 3D image when his or her eyes 120 view a pixel pattern 800 through the barrier pattern. 600. From FIG. 5A to FIG. 5B to FIG. 5C, the human eyes 120 gradually shift from left to right as viewed in the figures. Shown at the bottom of each of FIGS. 5A to 5C is a rectangle-arrayed pattern indicating that the barrier area 610 shifts from left to right in keeping with human eye movements in a single barrier shifting zone of the barrier pattern 600. This prevents the crosstalk incurred between the right eye oriented pixels and the left eye-oriented pixels.

FIG. 6 shows an electrode structure for moving the barrier pattern 600 over the parallax barrier panel. In FIG. 6, as in conventional setups, the common electrode 210 is formed flat over the common substrate 200. Meanwhile, the barrier electrodes 110 over the barrier substrate 100 extend in stripes in the depth direction of the figure. A barrier electrode pitch pb, at should be noted, is one tenth (1/10) of one barrier shifting zone of the barrier pattern. Whereas the setup in FIG. 6 supports a 10-level parallax, the barrier electrodes may alternatively be formed at a smaller pitch. In FIG. 6, 5 barrier electrodes 110 are turned on to form the barrier area 610, with 5 barrier electrodes 110 turned off to form the opening area 620. The number of barrier electrodes to be turned on is not limited to 5. To shift the position of the barrier area 610, the barrier electrodes 110 on either side of the barrier area 610 need only be turned off, with the barrier electrodes 110 on the other side of the barrier area 610 turned on.

When the barrier area 610 is formed by a plurality of barrier electrodes 110 in the manner described above, the position of the barrier area 610 can be shifted to ensure precise feedback through eye tracking. In FIG. 6, the barrier area 610 is formed where the barrier electrodes 110 are turned on, and the opening area 620 is formed where the barrier electrodes 110 are turned off. That the barrier electrodes 110 are turned on means that they are impressed with a voltage.

Figure 7:
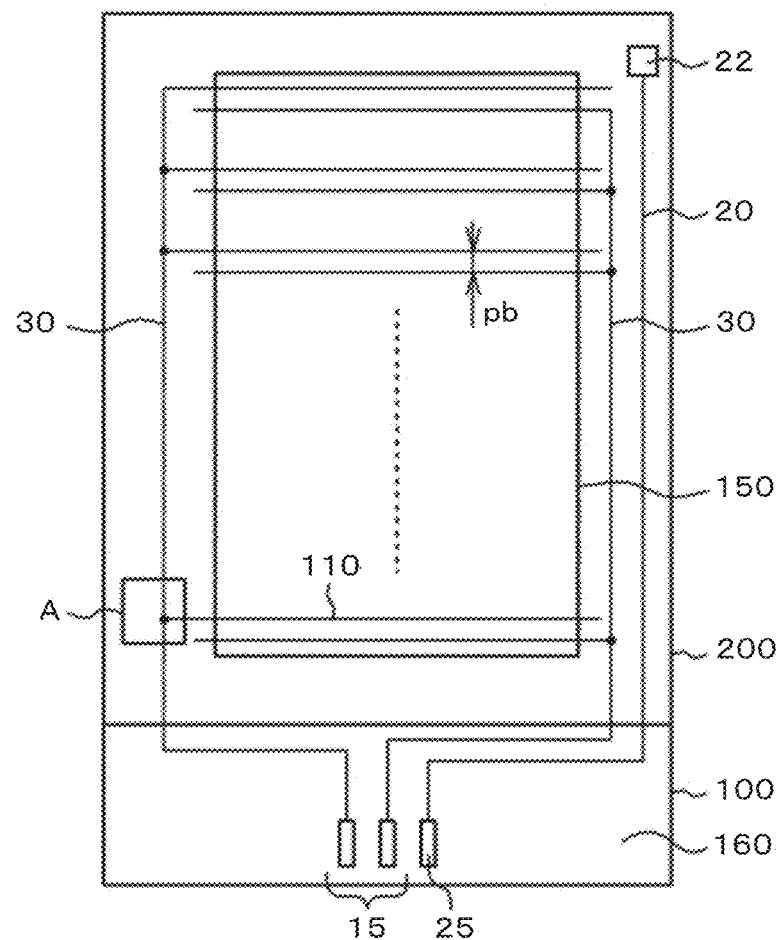
FIG. 7 is a plan view of a parallax barrier panel having barrier electrodes with single-layer wiring to improve parallax characteristics.

FIG. 7 is a plan view of a state in which the pitch pb of the barrier electrodes 110 is half (½) the pitch pp of the barrier pattern over the parallax barrier panel in FIG. 6. That is, the parallax barrier panel in FIG. 7 supports the eye tracking system for a 2-level parallax. In FIG. 7, the common substrate 200 is disposed on the barrier substrate 100, with liquid crystal sandwiched therebetween. The barrier substrate 100 is formed larger than the common substrate 200. That portion of the harrier substrate 100 which is not overlaid with the common substrate 200 constitutes a terminal area 160. Two barrier electrode terminals 15 and one common electrode terminal 25 are disposed in the terminal area 160. The common terminal 25 is connected, via a common wire 20 and a common wire connecting part 22, to the common electrode 210 formed on the common substrate 200.

One of the two barrier electrode terminals 15 is connected to a bus electrode 30 extending in a longitudinal direction on the left side of a display area 150. The other barrier electrode terminal 15 is connected to a bus electrode 30 extending also in the longitudinal direction on the right side of the display area 150. In FIG. 7, the barrier electrodes 110 extend alternately from the left-side and the right-side bus electrodes 30, in a crosswise direction over the display area 150. In the display area 150, the barrier electrodes 110 are arrayed at the pitch pb in the longitudinal direction.

Figure 8:
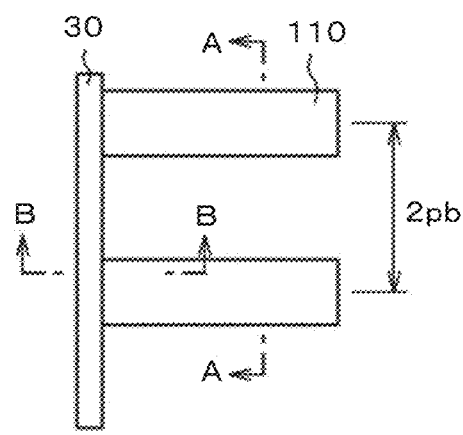
FIG. 8 is a detail view of an area A in FIG. 7.
Figure 9:
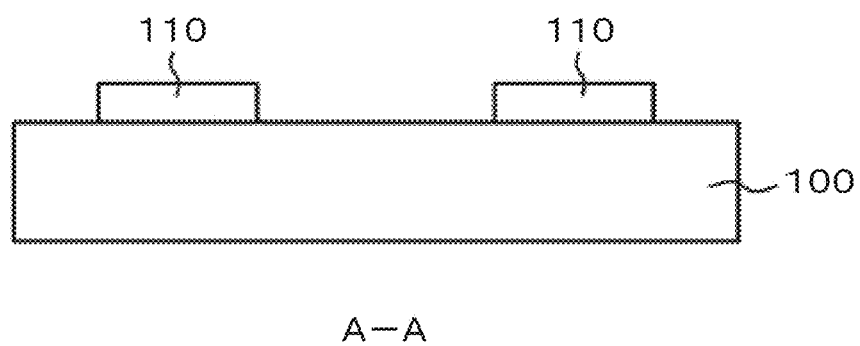
FIG. 9 is a cross-sectional view taken on line A-A in FIG. 8.
Figure 10:
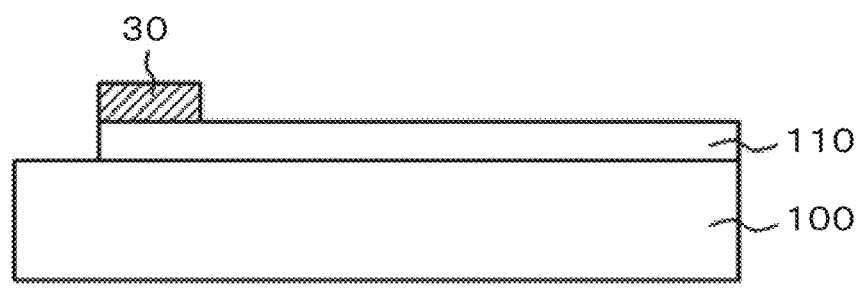
FIG. 10 is a cross-sectional view taken on line B-B in FIG. 8.

FIG. 8 is a detail view of an area A in FIG. 7. In FIG. 8, the bus electrode 30 extends in the longitudinal direction, with the barrier electrodes 110 extending in the crosswise direction from the bus electrode 30. Outside the display area 150, the harrier electrodes 110 are arrayed at a pitch of 2 pb. FIG. 9 is a cross-sectional view taken on line A-A in FIG. 8. The barrier electrodes 110 in FIG. 9 are constituted by indium to oxide (ITO) forming a transparent conductive film that is 77 μm thick, for example. FIG. 10 is a cross-sectional view taken on line B-B in FIG. 8. In FIG. 10, the bus electrode 30 is formed at the edge of the barrier electrodes 110. The bus electrode 30 is constituted by an alloy such as a molybdenum-chromium (MoCr) alloy or by a suitable metal and is 150 nm thick, for example. The ITO-constituted barrier electrodes 110, with the thick-film bus electrode 30 disposed thereon, are connected with low resistance to the barrier electrode terminals 15. However, the parallax barrier panel in FIG. 7 can support only the 2-level parallax. The wiring structure in FIG. 7 is not sufficient to support the parallax of 3 levels or more. Supporting the parallax of 3 or more levels requires multilayer wiring. Because the ITO constituting the barrier electrodes 110 is not completely transparent but has a predetermined transmission factor, a light pattern and a dark pattern are repeated in an ITO pattern. This leads to the generation of moire during 2D image display.

If the barrier area 610 is structured with many more barrier electrodes 110 as shown in FIG. 6, finer parallax adjustment can be supported in eye tracking. However, multilayer wiring is required in the structure shown in FIG. 6. Also, the structure in FIG. 6 involves slits 115 that cause light to pass through between the barrier electrodes 110, so that a light pattern and a dark pattern are repeated even in the barrier area. This results in the generation of moire during 3D image display. Furthermore, because the ITO constituting the barrier electrodes 110 is not completely transparent but has a predetermined transmission factor, a light pattern and a dark pattern are repeated in the ITO pattern. This leads to the generation of moire also during 2D image display.

Figure 11:
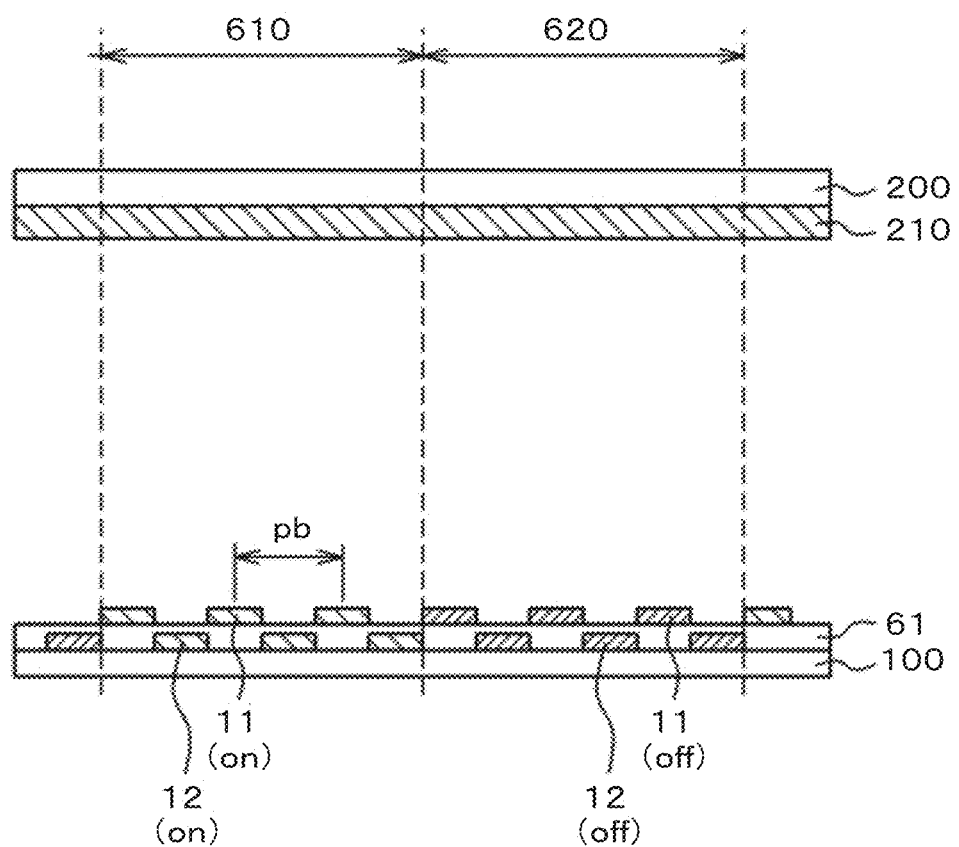
FIG. 11 is a cross-sectional view of a parallax barrier panel having two-layer barrier electrodes to which the present invention is adapted.

FIG. 11 is cross-sectional view of a parallax barrier panel that solves the above problem. What makes the structure of FIG. 11 different from that of FIG. 6 is that the barrier electrodes 110 are formed by upper layer barrier electrodes 11 and lower layer barrier electrodes 12 on the side of the harrier substrate 100. A first interlayer insulating film 61 is interposed between the upper layer barrier electrodes 11 and the lower layer barrier electrodes 12. In FIG. 11, one upper layer barrier electrode 11 and a lower layer barrier electrode 12 seen adjacent to that electrode 11 in a plan view are impressed with the same voltage. The two electrodes are paired to constitute a barrier electrode couple. Because the lower layer barrier electrodes 12 are found between the upper layer barrier electrodes 11 when viewed in a plan view, there is no slit-pattern opening area between the upper layer barrier electrodes 11. This prevents the generation of moire.

In FIG. 11, the width of each lower layer barrier electrode 12 may be the same as the gap between two upper layer barrier electrodes 11. However, considering the accuracy of alignment between the barrier substrate 100 and the common substrate 200, the width of each lower layer barrier electrode 12 may preferably be slightly wider than the gap between two upper layer barrier electrodes 11. Although FIG. 11 shows that each upper layer barrier electrode 11 has the same width as each lower layer barrier electrode 12, the two types of electrodes may be formed to have different widths. Specifically, each upper layer barrier electrode 11 may be formed to be wider than each lower layer barrier electrode 12, or vice versa. FIG. 11 shows a state in which the pitch pb of the upper layer barrier electrodes 11 is one-sixth (⅙) of the pitch pp of the barrier pattern. That is, the structure in FIG. 11 supports a 6-level parallax.

Figure 12:
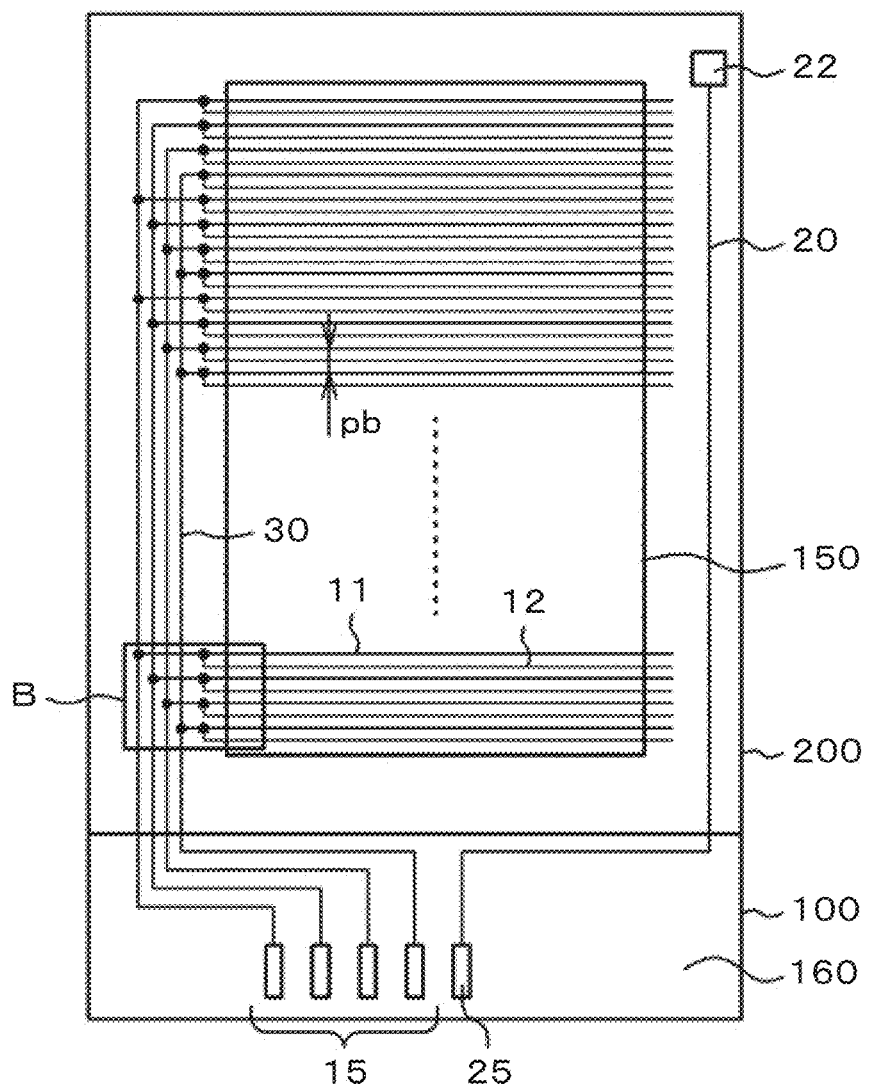
FIG. 12 is a plan view of a parallax barrier panel according to a first embodiment of the present invention.

FIG. 12 is a plan view of a parallax barrier panel in which the pitch pb of the upper layer barrier electrodes 11 is one-fourth (¼) of the pitch pp of the barrier pattern according to the system in FIG. 11. That is, the structure in FIG. 12 supports a 4-level parallax in FIG. 12, 4 barrier electrode terminals 15 are disposed to support the 4-level parallax. The bus electrode 30 connected to each of the 4 barrier electrode terminals 15 extends in the longitudinal direction on the left side of the display area 150.

From the bus electrodes 30, the upper layer barrier electrodes 11 extend in the crosswise direction over the display area 150. Also, the upper layer barrier electrodes 11 are arrayed at the pitch pb in the longitudinal direction over the display area 150. In FIG. 12, the lower layer barrier electrodes 12 are each paired with one upper layer barrier electrode 11 as they extend in the crosswise direction. The paired upper and lower barrier electrodes 11 and 12 carry the same potential. The other specifics of the structure are the same as those discussed above with reference to FIG. 7.

As shown in FIG. 12, supporting the parallax of more than 2 levels requires crossed wiring, which necessitates a multilayer wiring structure. In the structures in FIGS. 11 and 12, each barrier electrode couple needs to be formed by an upper layer barrier electrode 11 and a lower layer barrier electrode 12 which carry the same potential. In this case, an increasingly complicated wiring structure can result in a reduced production yield and lowered reliability. The present invention proposes configuring a parallax barrier panel in such a manner that it has its multilayer wiring structure simplified and its high reliability maintained.

Figure 13:
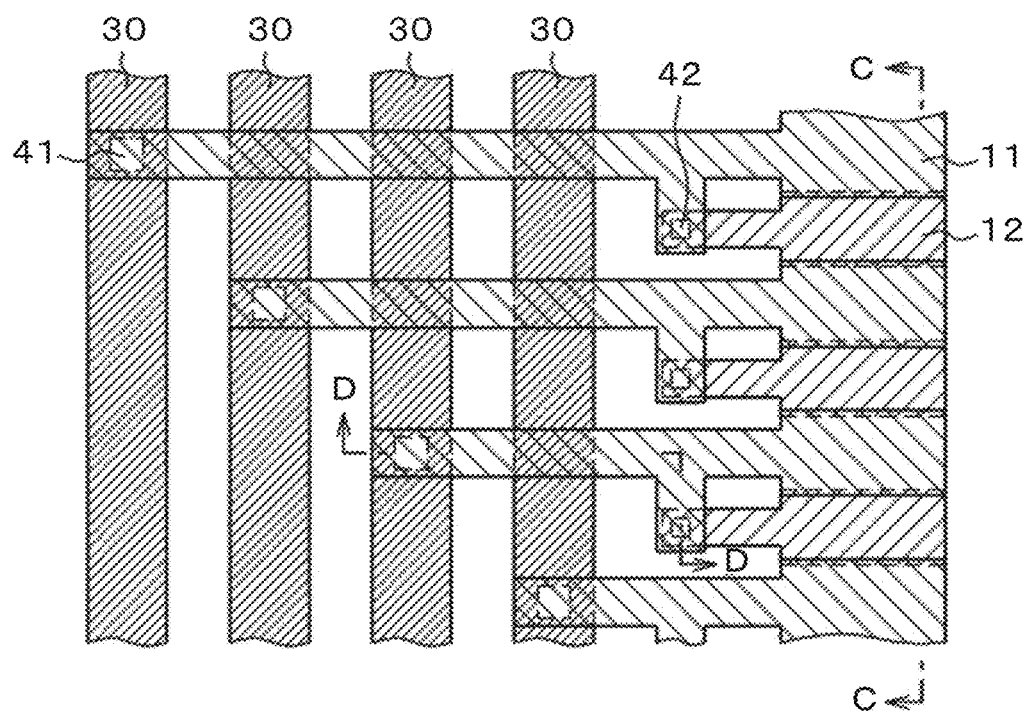
FIG. 13 is a detail view of an area B in FIG. 12.

FIG. 13 is a detail view of an area B in FIG. 12. In FIG. 13, 4 bus electrodes 30 extend in the longitudinal direction. The upper layer barrier electrodes 11 are connected individually to the bus electrodes 30 via first through holes 41. Each of the upper layer barrier electrodes 11 branches halfway to connect electrically, via a second through hole 42, to the lower layer barrier electrode 12 paired with that upper layer barrier electrode 11. The width of each lower layer barrier electrode 12 is formed slightly wider than the gap between two upper layer barrier electrodes 11. Thus when viewed in a plan view, there is no gap between the upper layer barrier electrodes 11 or between the lower layer barrier electrodes 12. This prevents moire from being generated.

Figure 14:
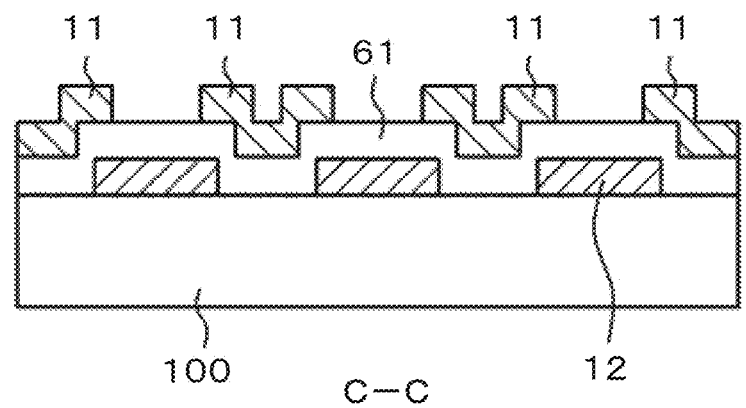
FIG. 14 is a cross-sectional view taken on line C-C in FIG. 13.

FIG. 14 is a cross-sectional view taken on line C-C in FIG. 13. In FIG. 14, a first interlayer insulating film 61 is interposed between the upper layer barrier electrodes 11 and the lower layer barrier electrodes 12. In FIG. 14, the upper layer barrier electrodes 11 and the lower layer barrier electrodes 12 are constituted by ITO and are 77 nm thick, for example.

Figure 15:
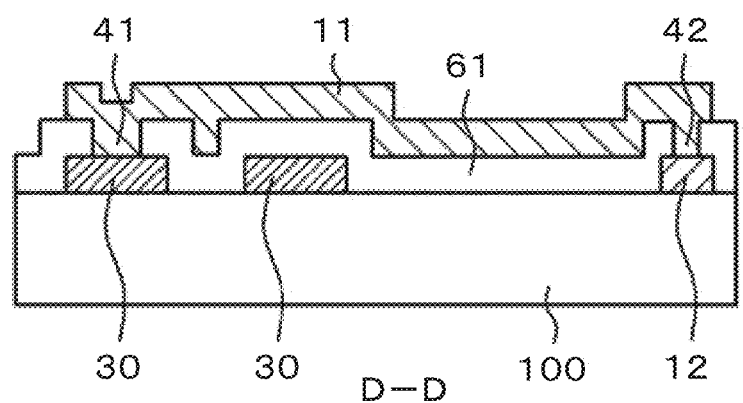
FIG. 15 is a cross-sectional view taken on line D-D in FIG. 13.

FIG. 15 is a cross-sectional view taken on line D-D in FIG. 13. In FIG. 15, the bus electrodes 30 and the lower layer barrier electrodes 12 are formed over the substrate 100. The first interlayer insulating film 61 is formed to cover these electrodes. The upper layer barrier electrodes 11 are formed over the first interlayer insulating film 61. The bus electrodes 30 are 150 nm thick, for example. The bus electrodes 30 are connected to the upper layer barrier electrodes 11 via the first through holes 41. The same upper layer barrier electrodes 11 are connected to the lower layer barrier electrodes 12 via the second through holes 42.

According to the present invention, the upper layer barrier electrodes 11 are connected to the lower layer barrier electrodes 12 at the same time as the upper layer barrier electrodes 11 are formed. This simplifies the production process. The simplified production process leads to reduced production costs and improved product reliability.

Second Embodiment

Figure 16:
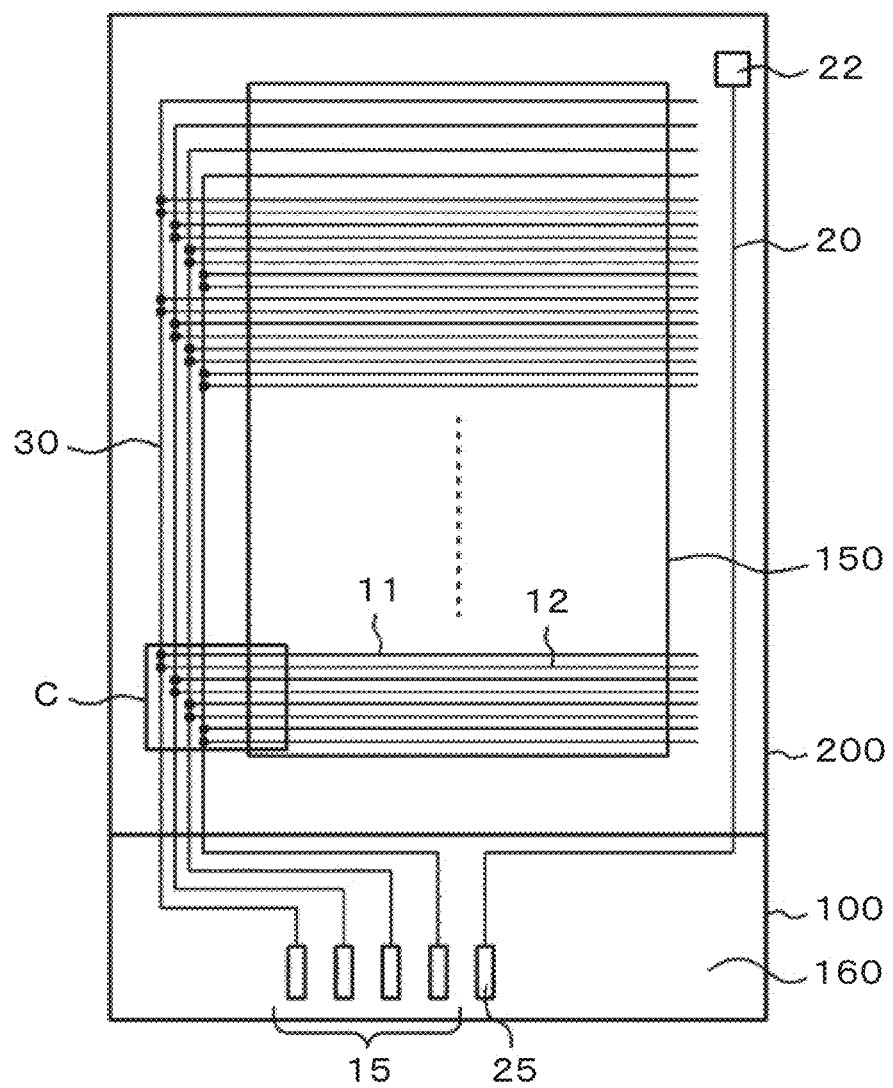
FIG. 16 is a plan view of a parallax barrier panel according to a second embodiment of the present invention.

FIG. 16 is a plan view of a parallax barrier panel according to a second embodiment of the present invention. As with the first embodiment, what is shown in FIG. 16 is a parallax barrier panel that supports the 4-level parallax in an eye tracking system. Thus the parallax barrier panel in FIG. 16 has 4 barrier electrode terminals 15. What makes the parallax barrier panel of FIG. 16 different from that of FIG. 12 is an area C structured to connect the upper layer barrier electrodes 11 with the lower layer barrier electrodes 12. The other specifics of the structure in FIG. 16 are the same as discussed above with reference to FIG. 12.

Figure 17:
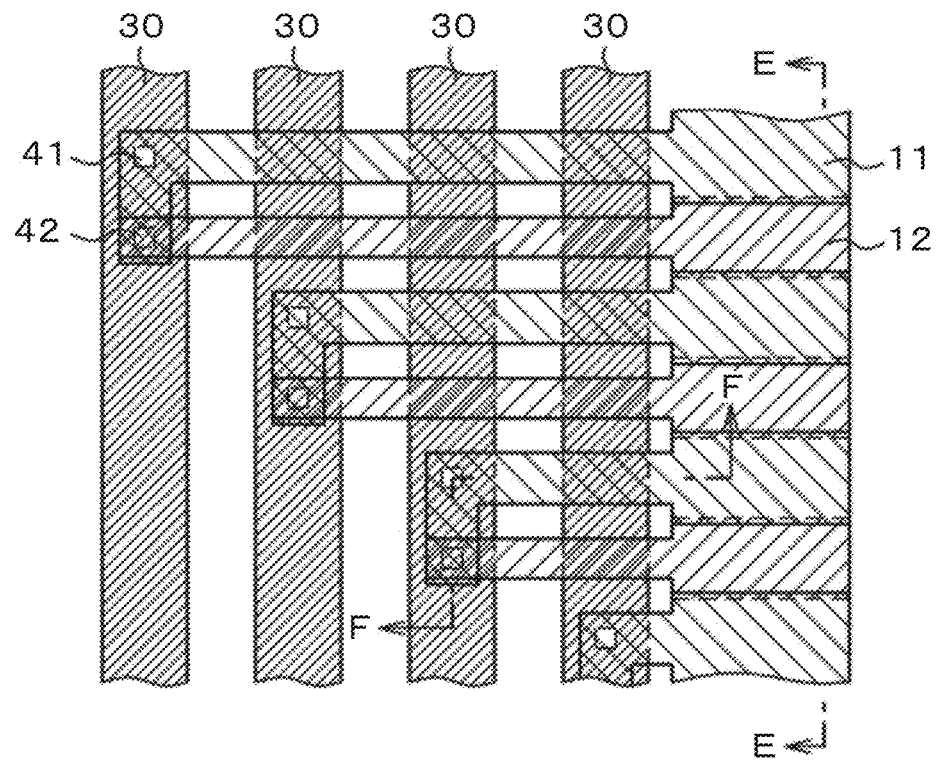
FIG. 17 is a detail view of an area C in FIG. 16.

FIG. 17 is a detail view of the area C in FIG. 16. In FIG. 17, 4 bus electrodes 30 extend in the longitudinal direction. The upper layer barrier electrodes 11 paired with the lower layer barrier electrodes 12 extend over the bus electrodes 30. This is what makes the structure in FIG. 17 different from the first embodiment. The upper layer barrier electrodes 11 bend over the bus electrodes 30 to conduct with the lower barrier electrodes 12 via the first through holes 41. That is, the upper layer barrier electrodes 11 are connected to both the lower layer barrier electrodes 12 and the bus electrodes 30 at the same time.

Figure 18:
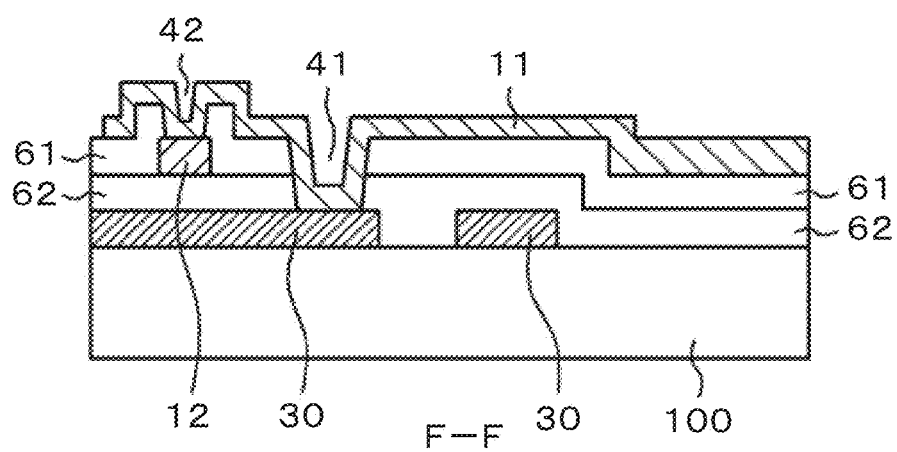
FIG. 18 is a cross-sectional view taken on lane F-F in FIG. 17.

FIG. 18 is a cross-sectional view taken on line F-F in FIG. 17. In FIG. 18, the bus electrodes 30 are formed over the substrate 100. A second interlayer insulating film 62 is formed to cover the bus electrodes 30. The lower layer barrier electrodes 12 are formed over the second interlayer insulating film 62. The first interlayer insulating film 61 is formed to cover the lower layer barrier electrodes 12. The upper layer barrier electrodes 11 are formed over the first interlayer insulating film 61.

The upper layer barrier electrodes 11 are connected to the bus electrodes 30 via the first through holes 41. The first through holes 41 penetrate the first and the second interlayer insulating films 61 and 62. Also, the upper layer barrier electrodes 11 are connected to the lower layer barrier electrodes 12 via the second through holes 42. That is, the bus electrodes 30 are connected to the lower layer barrier electrodes 12 at the same time as the upper layer barrier electrodes 11 are formed.

In the second embodiment, the upper and the lower layer barrier electrodes 11 and 12 are connected above the bus electrodes 30. This structure allows the crosswise size of the parallax barrier panel to be smaller than in the structure in FIG. 13. Generally, through holes tend to become wider than the width of wires. In the first embodiment, the through holes 41 via which the upper layer barrier electrodes 11 are connected to the lower layer barrier electrodes 12 are formed to be arrayed in the longitudinal direction. This structure tends to enlarge the longitudinal size of the connection areas. In the second embodiment, by contrast, the through holes 41 are formed to be staggered horizontally from one bus electrode 30 to another, as shown in FIG. 17. This structures reduces the longitudinal size of the connection areas.

In FIG. 17, the upper layer barrier electrodes 11 and the lower layer barrier electrodes 12 extend similarly up to the bus electrodes 30, so that the capacitance between the bus electrodes 30 on the one hand and the upper and lower layer barrier electrodes 11 and 12 on the other hand is increased. Thus if the barrier substrate 100 is charged with static electricity, for example, the possibility of the interlayer insulating films causing a dielectric breakdown is minimized.

The foregoing paragraphs have primarily explained the 3D display device operating by the parallax barrier method using an eye tracking system. Also according to the present invention, a 3D display device using a liquid crystal lens arrangement can also have its parallax characteristics improved by resorting to the eye tracking method. The parallax characteristics of the liquid crystal lens arrangement are improved by dividing the electrodes making up the liquid crystal lens into a plurality of portions. In view of this, the present invention explained above in conjunction with the first and the second embodiments can also be applied advantageously to the 3D display device that uses the liquid crystal lens arrangement.

In the foregoing description, it has been assumed that the display panel is a liquid crystal display panel. Alternatively, the present invention can be applied to other panels such as organic electroluminescent (EL) display panels.

What is claimed is:

1. A liquid crystal panel comprising a first substrate, a second substrate, liquid crystal sandwiched between the first substrate and the second substrate, wherein:
   the second substrate includes first transparent electrodes extending in a first direction and arranged at a first pitch in a second direction, second transparent electrodes extending in the first direction and arranged in the second direction, an insulating film interposed between the first transparent electrodes and the second transparent electrodes, and bus electrodes formed between the second substrate and the insulating film,
   the second transparent electrodes are arranged between the first transparent electrodes in a plan view,
   one of the first transparent electrodes is connected to one of the bus electrodes via a first through hole formed in the insulating film;
   one of the second transparent electrodes adjacent to the one of the first transparent electrodes is connected to the one of the first transparent electrodes via a second through hole formed in the insulating film,
   the second through hole does not overlap with the bus electrodes, and
   the one of the second transparent electrodes is connected to the one of the bus electrodes through the one of the first transparent electrodes.

2. The liquid crystal panel according to claim 1, further comprising a plurality of electrode couples, each of the plurality of electrode couples includes one of the first transparent electrodes and one of the second transparent electrodes.

3. The liquid crystal panel according to claim 1, wherein the second through holes are arranged in the second direction.

4. The liquid crystal panel according to claim 2, wherein the second through holes are arranged in the second direction.

5. A three-dimensional display device comprising a display panel and a parallax barrier panel, wherein:
   the parallax barrier panel has a first substrate, a second substrate, and liquid crystal sandwiched between the first substrate and the second substrate,
   the second substrate includes first barrier electrodes extending in a first direction and arranged at a first pitch in a second direction, second barrier electrodes extending in the first direction and arranged in the second direction, an insulating film interposed between the first barrier electrodes and the second barrier electrodes, and bus electrodes formed between the second substrate and the insulating film,
   the second barrier electrodes are arranged between the first barrier electrodes in a plan view,
   one of the first barrier electrodes is connected to one of the bus electrodes via a first through hole formed in the insulating film;
   one of the second barrier electrodes adjacent to the one of the first barrier electrodes is connected to the one of the first barrier electrodes via a second through hole formed in the insulating film,
   the second through hole does not overlap with the bus electrodes, and
   the one of the second barrier electrodes is connected to the one of the bus electrodes through the one of the first barrier electrodes.

6. The three-dimensional display device according to claim 5, wherein the parallax barrier panel comprises a plurality of the barrier electrode couples, each of the barrier electrode couples includes one of the first barrier electrodes and one of the second barrier electrodes.

7. The three-dimensional display device according to claim 5, wherein the three-dimensional display device is driven by an eye tracking system.

8. The three-dimensional display device according to claim 5, wherein the second through holes are arranged in the second direction.

9. The three-dimensional display device according to claim 6, wherein the second through holes are arranged in the second direction.

10. The three-dimensional display device according to claim 6, wherein the first through hole and the second through hole corresponding to one of the barrier electrode couples are formed on the same bus electrode in a plan view, and the first through hole and the second through hole corresponding to a different one of the barrier electrode couples are formed on another bus electrode in a plan view.

11. The three-dimensional display device according to claim 6, wherein the second barrier electrode of each barrier electrode couple is connected to the first barrier electrode of the barrier electrode couple via the second through hole.

12. The three-dimensional display device according to claim 5, wherein the display panel has a display area and a non-display area around the display area, wherein:
   the first barrier electrodes and the second barrier electrodes are formed in a portion corresponding to the display area, and
   the bus electrodes are formed in the non-display area.

13. The liquid crystal panel according to claim 1,
   wherein an edge of the one of the second transparent electrodes overlaps with an edge of the one of the first transparent electrodes in the second direction, in a plan view.

14. The three-dimensional display device according to claim 5, wherein an edge of the one of the second barrier electrodes overlaps with an edge of the one of the first barrier electrodes in the second direction, in a plan view.

\* \* \* \* \*